United States Patent [19]

Miller

[11] Patent Number: 5,050,817
[45] Date of Patent: Sep. 24, 1991

[54] COMBINED ROAD AND AIRCRAFT VEHICLE

[76] Inventor: Harvey R. Miller, 3655 E. Amazon, Eugene, Oreg. 97405

[21] Appl. No.: 421,672

[22] Filed: Oct. 16, 1989

[51] Int. Cl.$^5$ .......................................... B64C 37/00
[52] U.S. Cl. ..................................... 244/2; 244/49; 244/120; 244/50
[58] Field of Search .................. 244/49, 50, 2, 102 R, 244/104 R, 104 FP, 89, 120

[56] References Cited

U.S. PATENT DOCUMENTS

| | | | |
|---|---|---|---|
| 2,573,271 | 10/1951 | Perl | 244/2 |
| 2,609,167 | 9/1952 | Gero, Jr. | 244/104 R |
| 2,811,323 | 10/1957 | Rethorst | 244/2 |
| 2,893,661 | 7/1959 | Aylor | 244/2 |
| 2,940,688 | 6/1960 | Bland | 244/2 |
| 3,083,936 | 4/1963 | Rethorst | 244/49 |
| 3,371,886 | 3/1968 | Schertz | 244/2 |
| 4,269,374 | 5/1981 | Miller | 244/2 |
| 4,627,585 | 12/1986 | Einstein | 244/2 |
| 4,638,962 | 1/1987 | Gunter et al. | 244/102 R |
| 4,899,954 | 2/1990 | Pruszenski, Jr. | 244/2 |
| 4,915,324 | 4/1990 | Foreau et al. | 244/102 R |

FOREIGN PATENT DOCUMENTS

| | | |
|---|---|---|
| 994341 | 11/1951 | France . |
| 2591559 | 6/1987 | France . |
| 330809 | 10/1935 | Italy . |
| 433102 | 4/1948 | Italy . |

*Primary Examiner*—Galen Barefoot
*Attorney, Agent, or Firm*—Eugene M. Eckelman

[57] ABSTRACT

A vehicle chassis is supported on front and rear wheels for road and runway engagement. A propeller assembly is disposed between the front and rear wheels and faces the rear. Wing assemblies on opposite sides of the chassis are foldable along the sides of the chassis to form side panels for the road form of the vehicle. A tail assembly on the chassis is shiftable forwardly and rearwardly and has a pair of vertical stabilizers connected together at the top by a horizontal laterally extending stabilizer. A pressure regulated retractable stabilizing wheel is provided between the front and rear wheels and is arranged to engage a runway and provide stabilizing functions for take off and landing.

7 Claims, 3 Drawing Sheets

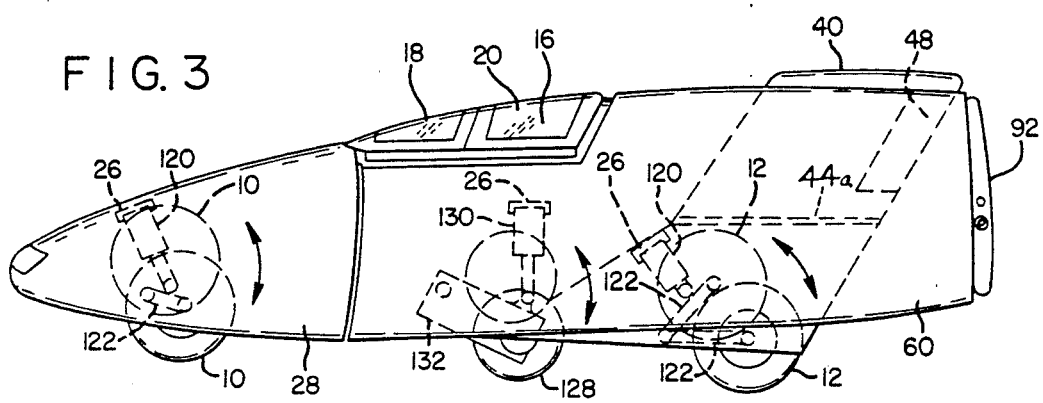
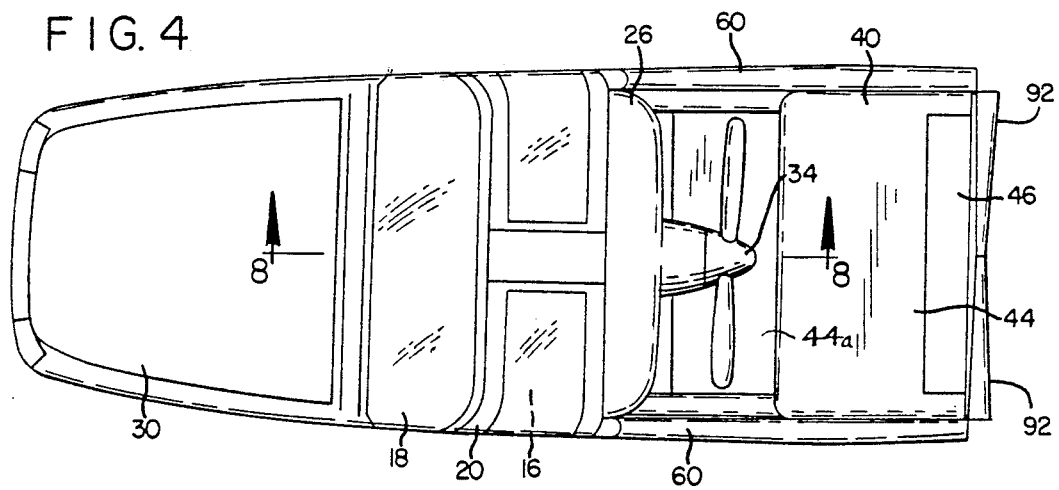
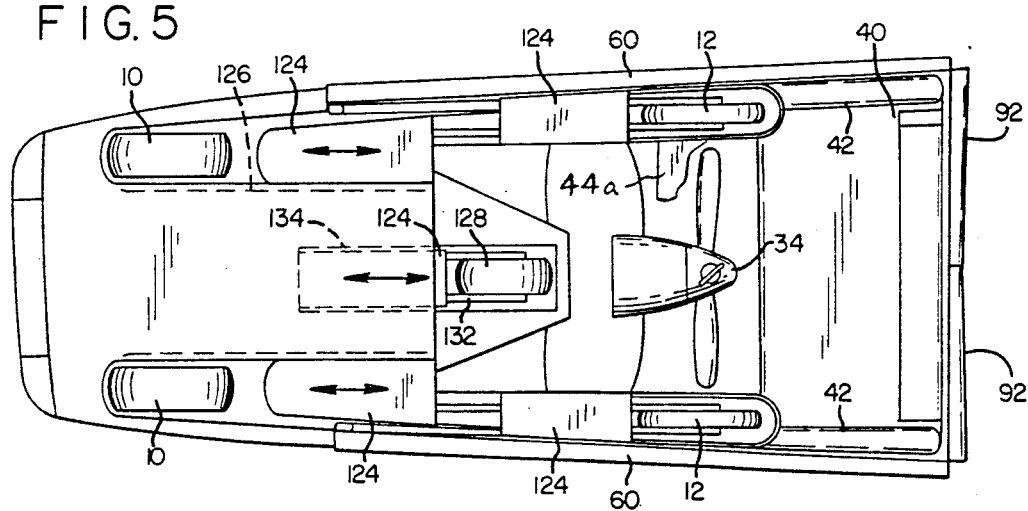

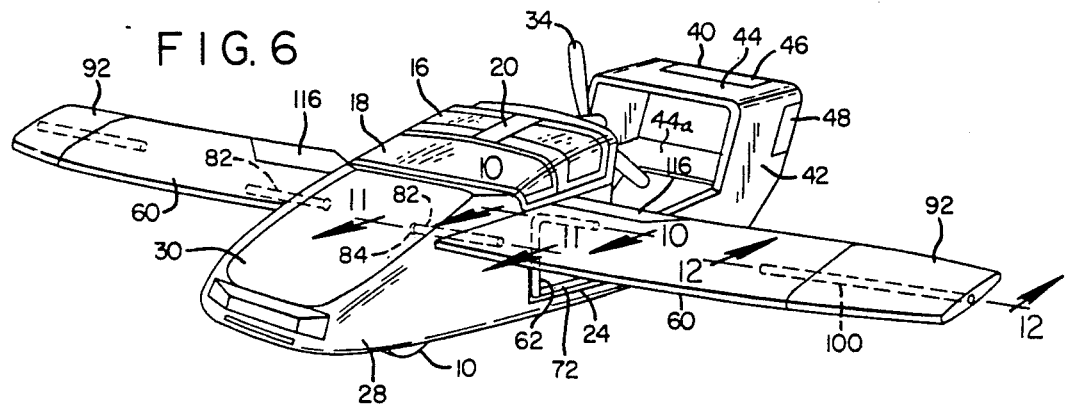
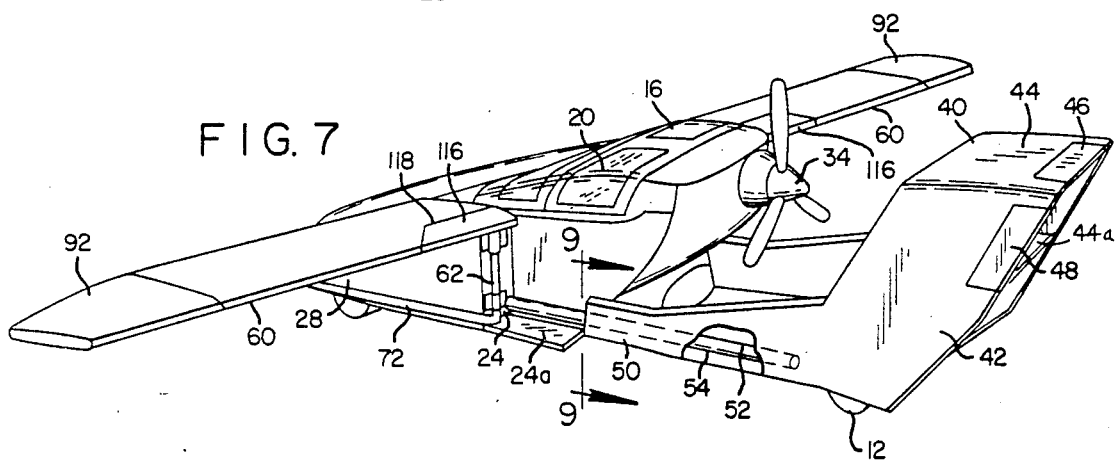
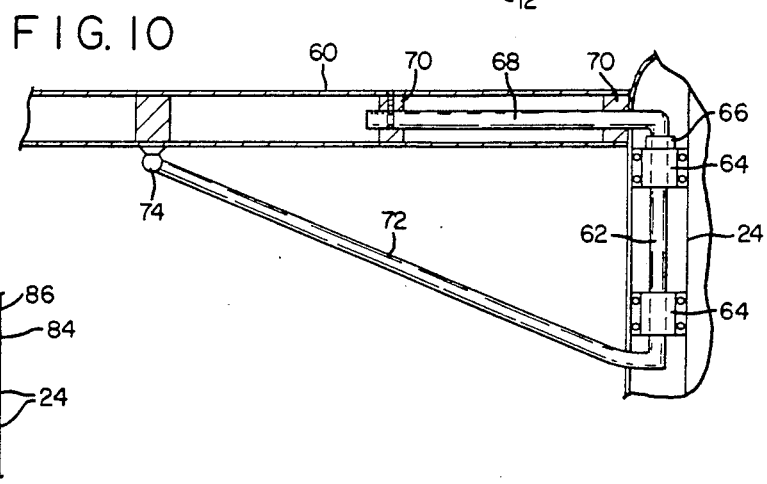
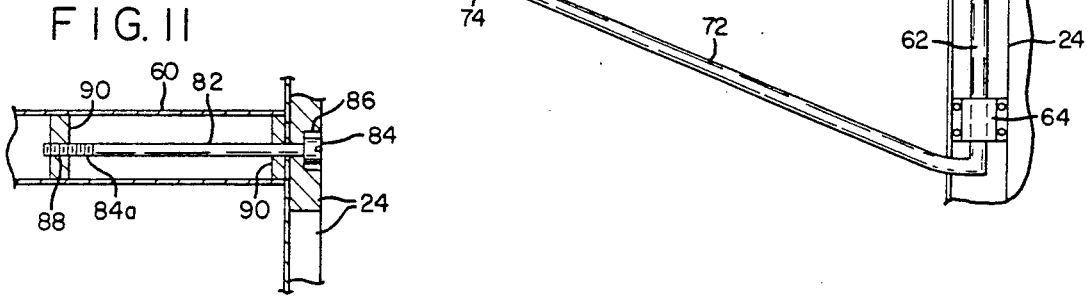
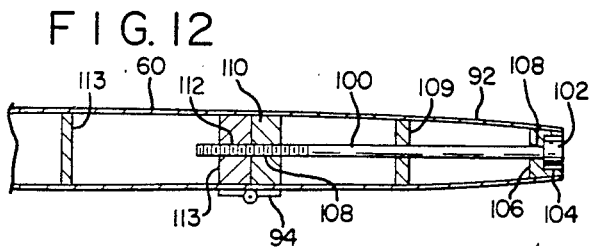

COMBINED ROAD AND AIRCRAFT VEHICLE

BACKGROUND OF THE INVENTION

This invention relates to new and useful improvements in a combined road and aircraft vehicle.

Combined road and aircraft vehicles have heretofore been provided wherein by converting certain elements, the vehicle can be operated on the highway or in the air. For example, U.S. Pat. Nos. 2,811,323, 2,940,688 and 3,083,936 illustrate structures which are converted from aircraft to road vehicles by folding the wings either into or on top of the body. In U.S. Pat. No. 2,573,271 the wings are folded into the body and also this structure employs a compacting tail structure to shorten the vehicle in its road form. In U.S. Pat. No. 3,371,886, the wings are folded to stand upright in the road form. U.S. Pat. No. 4,269,374 provides foldable wings which store them in inner side compartments.

SUMMARY OF THE INVENTION

It is an object of the present invention to provide improvements in a combined road and aircraft vehicle type structures.

More particularly, it is an object of the invention to provide wing sections that readily pivot rearwardly and form side and rear panels for the road form of vehicle.

Another object is to provide an improved tail assembly wherein stabilizer means thereof have vertical and horizontal portions, the vertical portions have forward extensions associated with shift means for moving the tail assembly between a retracted flying position and a forward road position.

Another object is to provide intermediate stabilizing wheel means which assist in takeoff and landing.

In carrying out the objectives of the invention, the vehicle comprises a chassis with front and rear wheel means, a central stabilizing wheel, and a propeller assembly. The propeller assembly is disposed between the front and rear of the chassis and faces the rear. Wing assemblies fold between an outward aircraft position and a folded stored position lying along the side of the chassis in the road form. A tail assembly includes a vertical stabilizer adjacent each side of the chassis and a horizontal stabilizer integrated with the vertical stabilizers at the top. The vertical stabilizers have a forward extension associated with shift means on the chassis for moving the tail assembly from a forward compacted road vehicle position to a rearward flying position spaced from the propeller assembly. The rear wheels are supported on the tail assembly. The central stabilizing wheel comprises a pressure regulated retractable wheel assembly arranged to engage a runway and provide a stabilizing lift and a shock absorbing landing as the vehicle in its aircraft form initiates take off and landing functions, respectively.

The invention will be better understood and additional objects and advantages will become apparent from the following description taken in connection with the accompanying drawings.

BRIEF DESCRIPTION OF THE DRAWINGS

FIG. 3 is a side elevational view of the vehicle in its road form, portions of this view being shown in phantom to illustrate retracting wheel structure.

FIG. 4 is a top plan view of the vehicle in road form.

FIG. 5 is a bottom plan view of the vehicle in its road form.

FIG. 6 is a perspective view of the vehicle taken from the front and one side and showing the vehicle in its aircraft form.

FIG. 7 is a perspective view of the vehicle taken from the rear and one side and also showing the vehicle in its aircraft form.

FIG. 10 is a fragmentary sectional view taken on the line 10—10 of FIG. 6 and showing pivot support structure for the wings.

FIG. 11 is a sectional view taken on the line 11—11 of FIG. 6 and showing locking means for supporting the pivotal wing in its horizontal aircraft form; and FIG. 12 is a sectional view taken on the line 12—12 of FIG. 6 showing foldable wing tip sections and means for locking such sections in the horizontal aircraft form.

DETAILED DESCRIPTION OF A PREFERRED EMBODIMENT

Figure 1:
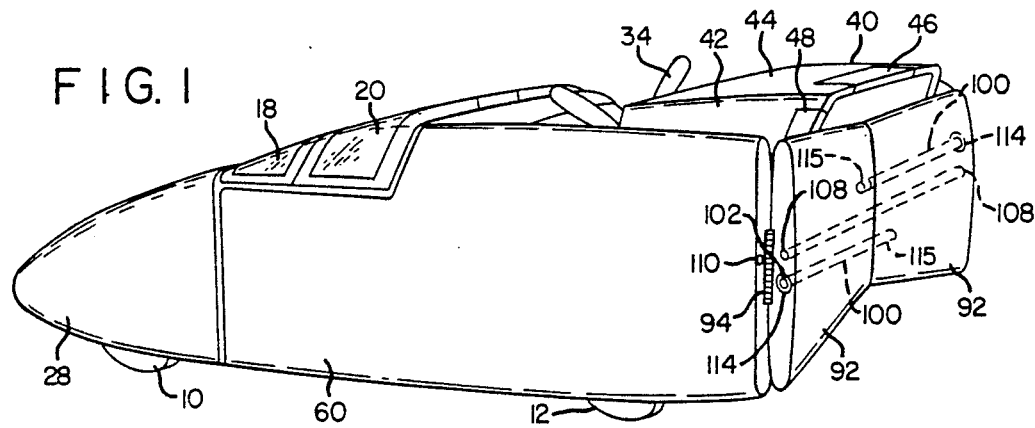
FIG. 1 is a perspective view of the present vehicle taken from the rear and one side and showing the vehicle in its road form.
Figure 2:
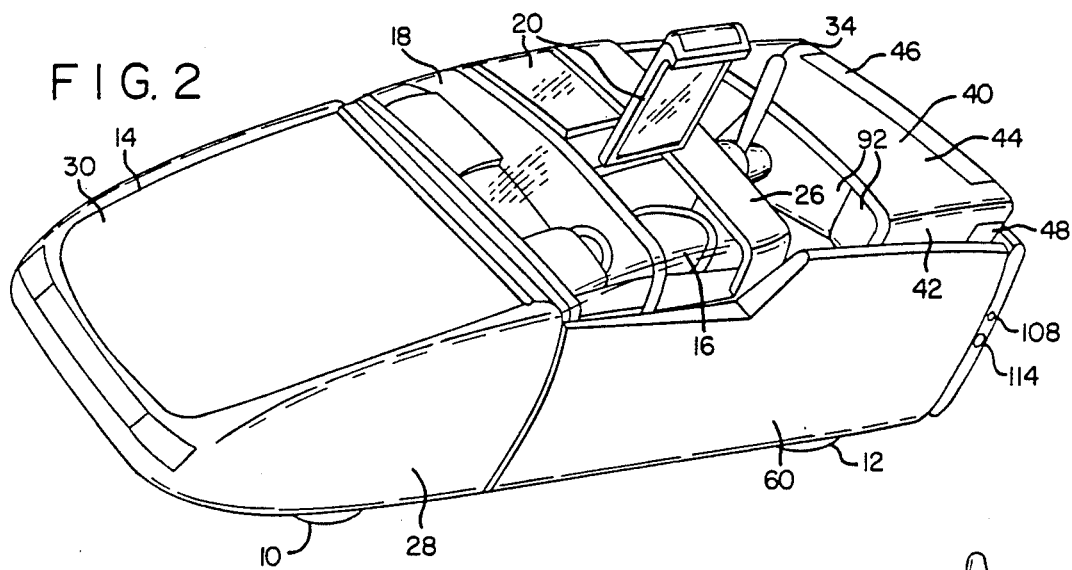
FIG. 2 is a perspective view of the vehicle taken from the front and top and also showing the vehicle in its road form.

With particular reference to the drawings, FIGS. 1-5 show the vehicle in its road form and FIGS. 6 and 7 show the vehicle converted to its aircraft form. The vehicle has front wheels 10 and rear wheels 12. The front wheels are steerable by any suitable conventional mechanism. An engine 14 is located at the front of the vehicle and immediately behind the engine is the operator's compartment 16 including a windshield 18 and a T-bar and butterfly-type roof 20 capable of providing access to and from the operator's compartment at each side. The doors in the roof are removable to provide a convertible mode for both the road and aircraft forms of the vehicle. The vehicle has a streamlined shape which helps support its weight in flight.

Figure 8:
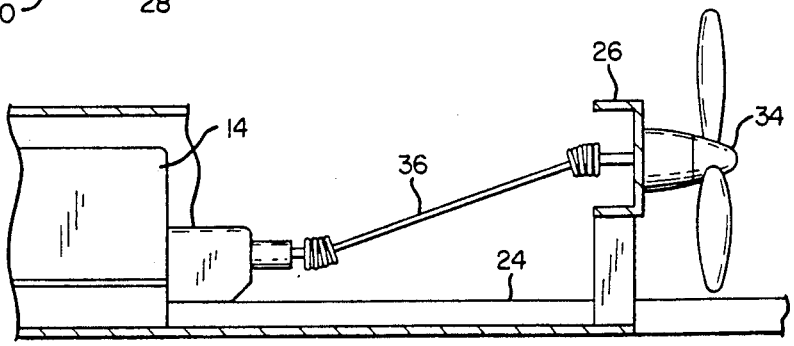
FIG. 8 is a fragmentary sectional view taken on the line 8—8 of FIG. 4 showing the propeller assembly and drive therefor.
Figure 9:
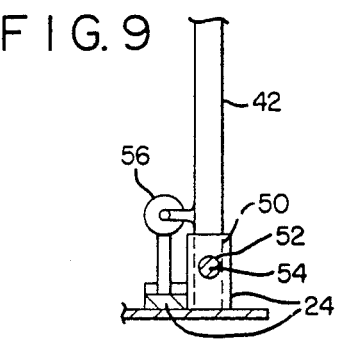
FIG. 9 is a fragmentary sectional view taken on the line 9—9 of FIG. 7 showing drive means for shifting the tail assembly between road and aircraft positions.

The vehicle has longitudinal side frames 24, FIGS. 6-9, and cross frames 26, FIGS. 2-4 and 8, to form a sturdy chassis. The frame members 24 and 26 support a suitable paneling or skin 28, including an engine hood 30, from the operator's compartment forward. Rearward of a cross frame 26 at the rear of the driver's compartment is a propeller assembly 34 for driving the vehicle in its aircraft form. As seen in FIG. 8, the propeller assembly is mounted on a cross frame 26 and driven by a shaft 36 from the engine 14.

Rearwardly of the propeller assembly is a tail assembly 40 for use of the vehicle in its aircraft form. This assembly has a pair of side vertical stabilizers 42 connected together at the top thereof by an integral horizontal stabilizer 44 and at an intermediate point by a second horizontal stabilizer 44a. Stabilizer 44 has conventional elevators 46 and vertical stabilizers have conventional rudders 48. Vertical stabilizers 42 have lower forwardly projecting extensions 50, FIGS. 7 and 9, which have a longitudinal bore 52 extending in from the front end thereof and leading to a point just short of the rearward end of the stabilizer. The bores 52 slidably receive elongated rigid support rods 54 projecting integrally in a rearward direction from the frame of the vehicle. In this arrangement, the tail assembly is supported and is capable of being moved to an inward position close to the propeller, as seen in FIGS. 1-5, for compacting the vehicle in its road form. When the vehicle is to be converted to aircraft form, the tail assembly 40 is moved rearwardly, FIGS. 6 and 7, for spacing it from the propeller. This rear spacing of the stabilizers 42 and 44 obtains a proper moment arm with the propeller drive for efficient and smooth flying and when moved forwardly keeps the road vehicle body in proper proportion. Inward and outward movement of the tail assembly as well as locking positioning thereof in such positions is accomplished by a fluid operated piston cylinder assembly 56, FIG. 9, connected between the extension 50 of the tail assembly and the vehicle frame 24.

The vehicle employs wings 60 capable of being folded to lie along the vehicle in the road form and capable of being extended out laterally in the aircraft form. The wings are supported on upright rods 62, FIGS. 6, 7 and 10, having vertical rotatable support in upper and lower journals 64 secured integrally to the frame of the vehicle. Each rod 62 has an integral collar 66 that provides the support thereof on the upper journal. The upper end of the rod has an integral angled extension 68 projecting rotatably through reinforced cross frame portions 70 in the wing. The rod extension 68 and frame portions 70 provide sturdy support of the wing in its outward flying position and also allow it to be rotatable on a horizontal axis for folding, to be described. The lower end of support rods 62 also has an integral extension 72, such extension angling upward and outwardly and being secured at its upper end to an outer portion of the underside of the wing by a universal connection 74 laterally aligned with the support rod 62. Extension 72 serves as a reinforcing and anchoring strut for the wing in the extended flying position of the wing. By means of this pivot support for the wing, the front edge of the wing can be brought up to flying position by turning it on the horizontal axis 68, or the wing can be turned with its front edge down to position the wing vertically. It can then be rotated on the axis 62 to lie along the side of the vehicle chassis in the road form.

The wings are held in the level aircraft flying form at their rear portion by the pivot rod 62 and at the front by locking support bars 82, FIGS. 6 and 11, extending into the inner end of the wing from inside the motor compartment portion of the chassis. Each of these bars has a head portion 84 arranged to be received in a recess 86 in a frame portion 24 of the chassis and a threaded end 84a arranged for threaded engagement with a tapped bore 88 in an inner reinforced cross frame portion 90 of the wing.

A tip portion 92 of each wing 60 is hingedly secured to the main portion of the wing, as by hinges 94, FIG. 12, which lie along the adjacent ends of the main wing and tips 92 and allow the latter to fold toward the underside of the wing. A threaded locking support bar 100 extends inward from the outer end of portion 92. This bar has a head portion 102 arranged to be received in a recess 104 in an end frame portion 106. The bar 100 extends in a snug but slidable fit through a bore 108 in the recessed frame portion 106, through an intermediate cross frame portion 109 and the bore 108 in an end cross frame portion 110 at the hinge end of the tip 92. Bar 100 then extends into threaded engagement with a tapped bore 112 in a cross frame portion 113 at the end of the wing. When threaded in place in the tip 92 as shown in FIG. 12, rod 100 holds the tip rigidly in alignment with the wing. When removed, the tip portions can fold.

As noted above, the wing support rods 62, upon removal of the locking support bars 82, will allow the wings to drop down to a vertical or edge upright position and the wings can then be rotated rearwardly on the rods 62 to lie along the sides of the chassis in the road form of the vehicle. As best apparent in FIG. 7, the chassis includes side support surfaces 24a such as lateral extensions on frame 24, for the folded wings. In this road form of the vehicle, the tail assembly 40 is moved inwardly on the support rods 54 and the tips 92 of the wings are folded inwardly toward each other, as best seen in FIG. 1, after first removing the locking support bars 100.

The wing tips 92 are provided with apertures 114, shown diagrammatically in FIG. 1, offset vertically from the apertures 108 for the bar 100 in its wing tip support position. The outer ends of the wing tips in alignment with the vertically offset apertures 114 have a threaded insert 115 with a threaded bore similar to bore 112 in cross frame portion 113. Thus, the locking support bars 100 can be reinserted in reverse, namely, through the bore 108 in frame portions 110 and 106 at the hinged end of the tips 92 and then into threaded engagement with inserts 115 of the other wing tip.

Wings 60 have flaps 116, FIG. 7, that assist in take-off and landing in a conventional manner. Importantly, however, these flaps are in cutout portions 118 at the inner end of the wings and can be turned down and back under the wings to leave a recess in the wings when folded back, FIGS. 1-3, for contributing to the design of the road vehicle and also for allowing easier access to the driver's compartment.

It is desirable that the front and rear wheels be retractable upwardly and for this purpose, conventional retracting means may be employed. As an example, fluid operated cylinders 120, FIG. 3, connected between frame members 26 and lever arms 122 that support the wheels can be employed to raise and lower the wheels. It is preferred that the bottom openings to the wheels be closed in the flying form of the vehicle, and for this purpose panels 124, FIG. 5, slidably mounted in longitudinal guide grooves 126 are employed for opening and closing the wheel wells. These slide panels can be power operated if desired, as by a conventional fluid operated cylinder means, not shown.

The present vehicle also employs a central landing wheel assembly 128. This wheel assembly is also retractable such as by a fluid operated cylinder assembly 130 secured between a frame member 26 and a lever arm 132 pivotally connected to the frame of the vehicle and having travel that supports the wheel down below wheels 10 and 12. This wheel is also associated with a panel 124 having sliding support in side recesses 134 arranged to cover the bottom opening to the wheel well when the wheel is retracted.

Cylinder 130 comprises a pressure regulated shock absorber type cylinder having a selected force that will stabilize the vehicle during take off and landing. That is, the holding force of the cylinder 130 for the wheel 128 is less than the weight of the vehicle but has stabilizing function during take off and landing, as will be described more fully hereinafter.

In the operation of the present vehicle in its road form, the wings 60 and tip portions 92 thereof are folded to the FIG. 1 position in the road form and a locking support bar 100 inserted in its reverse position in the tip portions 92 to hold the said portions together to form the rear panel of the road vehicle. Support bar 100 serves to hold the main wing portions against the side of the vehicle chassis and form the side panels.

In the road form of the vehicle, the tail assembly 40 is moved inwardly in the compacting position. Horizontal stabilizer 44 serves as a spoiler.

To convert the vehicle to flying form, the wing tips 92 are disconnected from each other at the rear of the vehicle and the bars 100 inserted as shown in FIG. 12 to hold the wing tips in the flying position. The wings are swung outwardly around the upright rods 62 while in their vertical or edge position to an outwardly extended flying position. The wings are then pivoted on the horizontal axis bar extension 68 by bringing the front edge thereof up to a horizontal wing position and then installing locking bars 82 as shown in FIG. 11. Thereupon, the tail assembly 40 is shifted rearwardly to provide a proper moment arm with the propeller for smooth flying and good maneuverability.

In the takeoff condition of the vehicle, all the wheels are extended, including the center stabilizing wheel 128. As the takeoff proceeds and the wings commence their lift of the vehicle off the ground, the front and rear wheels 10 and 12 will lift but since the stabilizing wheel 128 is lower than the wheels 10 and 12, it will remain in ground contact until full wing support is achieved. This provides stability in takeoff. Conversely, as the aircraft approaches landing, the stabilizing wheel 128 will engage the runway first, and since the cylinder 130 is designed so as not to fully support the vehicle, the aircraft will settle down gradually on the front and rear road wheels.

According to the present invention, a combined road and aircraft vehicle is provided which is readily convertible from one form to the other. Such conversion is accomplished by a single person if necessary and without special tools and in a reasonably time. All the parts of the vehicle are intact and merely pivot or slide into place during conversion. The retracting tail assembly provides for novel compaction into the road form and when extended provides a good moment arm with the propeller for accomplishing maneuverability. The wings when folded form side panels for the road vehicle. Also, these wrap-around wings give sufficient wing area for efficient lift and also allow efficient length compaction of the vehicle for road travel.

It is to be understood that the form of my invention herein shown and described are to be taken as a preferred example of the same and that various changes in the shape, size and arrangement of parts may be resorted to without departing from the spirit of my invention, or the scope of the subjoined claims.

Having thus described my invention, I claim:

1. A combined road and aircraft vehicle comprising:
   a chassis having front, rear and side portions,
   a propeller assembly for driving the vehicle in the air, said propeller assembly being disposed between the front and rear of said chassis and facing the rear,
   wing assemblies on opposite sides of said chassis for supporting the vehicle in the air,
   folding support means for said wing assemblies arranged to support said wing assemblies in an outward aircraft form of the vehicle or in a folded stored position lying along the side of the chassis in a road form of the vehicle,
   a tail assembly on said chassis,
   shift means arranged to slidably shift said tail assembly alternately between a forward compacted road vehicle position and a rearward aircraft position spaced from said propeller assembly,
   first wheel means on the front of said chassis providing front end support of the vehicle on a road and runway,
   and second wheel means on said tail assembly providing rear end support of the vehicle both on a road in the road form of the vehicle and on a runway in the aircraft form of the vehicle.

2. The combined road vehicle and aircraft of claim 1 including stabilizing wheel means intermediate said front and rear wheel means, said stabilizing wheel means comprising a pressure regulated retractable wheel arranged to engage a runway and provide stabilizing lift and shock absorbing landing as the vehicle in its aircraft form initiates take off and landing functions, respectively.

3. The combined road and aircraft vehicle of claim 1 wherein said tail assembly comprises lower forwardly leading extensions with longitudinal socket means and the chassis comprises integral rearwardly extending guide and support rods slidably engageable in said socket means providing slidable guide and support means for said tail assembly.

4. The combined road and aircraft vehicle of claim 1 wherein each of said wing assemblies has a hinged end extension arranged to extend outwardly in the plane of said wings in the aircraft form of the vehicle and arranged to extend angularly relative to said wings on a vertical axis in a compacted road vehicle position of the tail assembly and a folded position of the wings forming a rear panel for the chassis in its road form.

5. The combined road and aircraft vehicle of claim 4 including removable lock bars at said hinged end extension for holding said extensions outwardly in the plane of the wings and for engaging opposite folded end extensions of the wings when forming the rear panel for the chassis.

6. The combined road and aircraft vehicle of claim 1 wherein the folding support means for each of said wing assemblies comprises a vertical support rod pivotally supported at the side of said chassis, a right angle horizontal extension on said support rod pivotally engageable with the wing assembly longitudinally adjacent a rear edge thereof, whereby said wing assembly is arranged to pivot on said horizontal extension to turn it up edgewise and to pivot rearwardly to said stored position lying along the side of the chassis in the road form of the vehicle, and a horizontal locking support bar supported on said chassis and removably engageable with said wing assembly adjacent a front edge thereof for supporting said wing assembly in its outward aircraft form.

7. The combined road and aircraft vehicle of claim 6 including an angled support strut connected integrally to a lower end of said vertical support rod and universally connected to an outer portion of said wing assembly.

* * * * *